US009176956B2

(12) United States Patent
Kim

(10) Patent No.: US 9,176,956 B2
(45) Date of Patent: Nov. 3, 2015

(54) APPARATUS AND METHOD FOR PROVIDING SEARCH SCREEN

(75) Inventor: Won-Sik Kim, Gumi (KR)

(73) Assignee: LG ELECTRONICS INC., Seoul (KR)

(*) Notice: Subject to any disclaimer, the term of this patent is extended or adjusted under 35 U.S.C. 154(b) by 590 days.

(21) Appl. No.: 12/811,196

(22) PCT Filed: Mar. 18, 2009

(86) PCT No.: PCT/KR2009/001355
§ 371 (c)(1),
(2), (4) Date: Jun. 29, 2010

(87) PCT Pub. No.: WO2009/125928
PCT Pub. Date: Oct. 15, 2009

(65) Prior Publication Data
US 2010/0287508 A1 Nov. 11, 2010

(30) Foreign Application Priority Data

Apr. 7, 2008 (KR) ........................ 10-2008-0031978

(51) Int. Cl.
G06F 3/048 (2013.01)
G06F 17/30 (2006.01)

(52) U.S. Cl.
CPC .......... G06F 17/30023 (2013.01); G06F 3/048 (2013.01)

(58) Field of Classification Search
CPC .... G06F 3/0482; G06F 3/048; G06F 3/04817
USPC .................................. 715/835; 707/752, 737
See application file for complete search history.

(56) References Cited

U.S. PATENT DOCUMENTS

| 7,523,187 | B1* | 4/2009 | Lavallee et al. | 709/223 |
| 2004/0088280 | A1 | 5/2004 | Koh et al. | |
| 2004/0107268 | A1 | 6/2004 | Iriya et al. | |
| 2004/0193621 | A1* | 9/2004 | Moore et al. | 707/100 |
| 2004/0193672 | A1* | 9/2004 | Samji et al. | 709/200 |
| 2005/0289107 | A1* | 12/2005 | Arrouye et al. | 707/1 |
| 2006/0282789 | A1* | 12/2006 | Kim | 715/764 |
| 2008/0077658 | A1 | 3/2008 | Kojima | |
| 2008/0109094 | A1 | 5/2008 | Nakamura et al. | |

(Continued)

FOREIGN PATENT DOCUMENTS

| JP | 2004-199574 A | 7/2004 |
| KR | 10-2004-0060840 A | 7/2004 |
| KR | 10-2004-0060841 A | 7/2004 |
| KR | 10-2005-0046450 A | 5/2005 |
| KR | 10-2005-0084999 A | 6/2005 |

(Continued)

Primary Examiner — Jennifer To
Assistant Examiner — Ashley Fortino
(74) Attorney, Agent, or Firm — Birch, Stewart, Kolasch & Birch, LLP

(57) ABSTRACT

The present embodiment provides an apparatus for providing a search screen comprising: a data communication unit that performs a data communication with a storage medium in which at least one data is stored; a control unit that analyzes types of data for the at least one data provided through the data communication unit and sorts the provided at least one data based on the analyzed types of data; and a search screen generation unit that generates a search screen for the at least one data sorted based on the types of data, wherein the search screen generation unit generates virtual folders corresponding to the types of data and disposes the data corresponding thereto in the virtual folders for generated each type of data.

12 Claims, 7 Drawing Sheets

(56) References Cited

U.S. PATENT DOCUMENTS

2009/0138808 A1* 5/2009 Moromisato et al. ......... 715/758
2009/0327904 A1* 12/2009 Guzak et al. .................. 715/738

FOREIGN PATENT DOCUMENTS

| KR | 10-2006-0128202 A | 12/2006 |
| WO | WO 2004/046945 A1 | 6/2004 |

* cited by examiner

APPARATUS AND METHOD FOR PROVIDING SEARCH SCREEN

CROSS-REFERENCE TO RELATED APPLICATIONS

The present application claims priority under 35 U.S.C. 119 and 35 U.S.C. 365 to Korean Patent Application No. 10-2008-0031978 (filed on 7 Apr. 2008), which is hereby incorporated by reference in its entirety.

BACKGROUND

The present embodiment relates to a display apparatus, and more particularly, to an apparatus and a method for providing a search screen on which search and management for each data is facilitated by sorting a large amount of data using a virtual folder.

In recent, diverse sorts of contents such as TV broadcasting programs, video clips, music, e-mails and electronic books, etc. have been provided in a display apparatus. Also, there has been an explosive increase in the number of the provided contents.

The contents may have been provided from diverse sources and the applicability of the contents has also been considerably increased.

For example, the number of television channels that can be applied in most countries have been considerably increased for the past few years, and viewers can receive several tens or several hundreds of different TV broadcasting channels. Also, the TV broadcasting channels are provided from different broadcasting stations and sources, wherein these are communicated through diverse media including terrestrial wireless broadcasting, cable distributions or satellite broadcastings.

Similarly, there has been an explosive increase in the number of applicable wireless channels, wherein they are provided through different media such as satellite broadcastings, digital terrestrial broadcasting and cable distributions, and an internet.

Also, the contents may be provided from a non-broadcast related storage apparatus such as a CD (CD-DA), a video CD, and DVD-video, etc. Also, the increase in electronic communication causes an increase in distribution and change of electronic contents such as electronic books, e-mails, documents, and audio files, etc.

Meanwhile, as shown in FIG. 1, a search screen generally provided is provided based on the sort conditions designated when data is originally stored. Here, the search screen includes a first region 100 on which the sort of storage media currently connected are displayed, a second region 101 on which icons of files and/or folders stored in a specific storage medium of the storage media displayed on the first region 100, selected by a user, are displayed, and a third region 102 on which information on specific files and/or folders of the files and/or folders displayed on the second region 101, currently highlighted, are displayed.

However, there has been an explosive increase in the amount of the applicable contents item, contents source and storage apparatus, an impractical problem arises in that a lots of time is rendered for searching a specific data from the search screen provided as above. Also, when a user stores a specific data in an incorrect folder, it may be difficult to find the corresponding data.

Therefore, there is a demand for a method to facilitate the search for specific data by efficiently sorting a large amount of data.

SUMMARY

An object of the present embodiment is to provide a search screen on which a search for specific contents is facilitated in a display apparatus that playbacks diverse sorts of contents (moving pictures, MP3, photos, and texts).

Also, the present embodiment allows the data stored in a storage medium according to the sort of data to be sorted and disposed.

The technical problems to be accomplished in the proposed embodiment are not limited to the technical problems as described above, but other technical problems not described may be clearly understood by those skilled in the art from the technical field set forth herein.

In order to accomplish the above object, according to the present embodiment, there is provided an apparatus for providing a search screen comprising: a data communication unit that performs a data communication with a storage medium in which at least one data is stored; a control unit that analyzes types of data for the at least one data provided through the data communication unit and sorts the provided at least one data based on the analyzed types of data; and a search screen generation unit that generates a search screen for the at least one data sorted based on the types of data, wherein the search screen generation unit generates virtual folders corresponding to the types of data and disposes the data corresponding thereto in the virtual folders for generated each type of data.

According to the present embodiment, there is provided a method for providing a search screen comprising: analyzing at least one data stored in a specific storage medium and confirming the type of data; grouping the same type of data into one group based on the confirmed type of data; generating a data search screen grouped for each type of data; and displaying the generated data search screen.

According to the present embodiment, there is provided a data search interface, which is provided as an OSD screen of a display apparatus so that specific data can be searched according to the types of data stored in a selected storage medium, comprising: a first region on which icon information for the storage medium selected by a user of icon information on the entire storage media connected to the display apparatus is highlighted; a second region on which virtual folder icons generated corresponding to the types of data stored in the selected storage medium are displayed; and a third region on which preview information on data existing in the specific virtual folder of the virtual folder icons displayed on the second region, having a search cursor, is displayed.

DETAILED DESCRIPTION OF THE EMBODIMENTS

Figure 1:
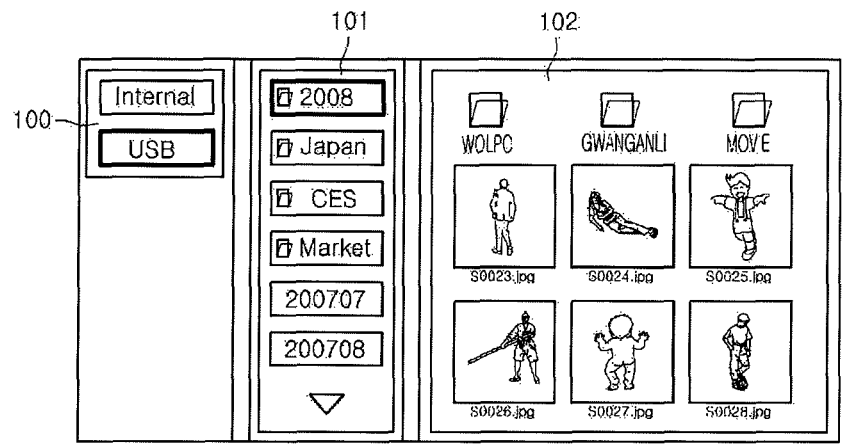
FIG. 1 is a view showing a search screen provided in a general display apparatus.
Figure 2:
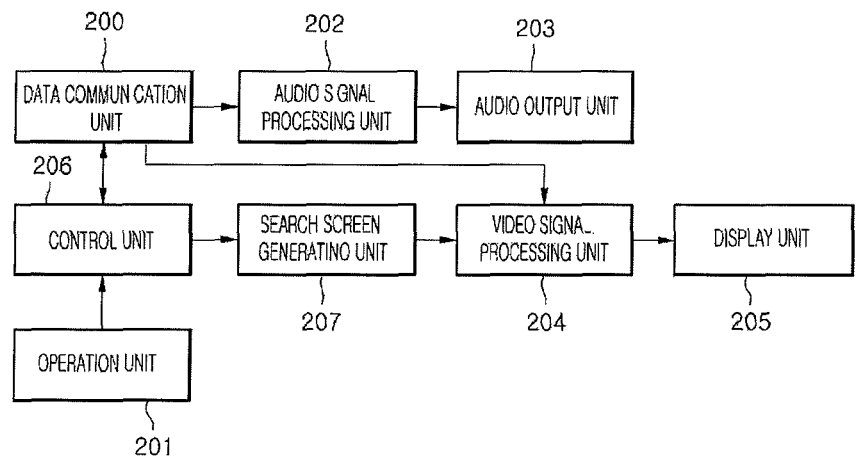
FIG. 2 is a view showing a constitution of an apparatus for providing a search screen according to the present embodiment.

FIG. 2 is a view showing a constitution of an apparatus for providing a search screen according to the present embodiment.

The apparatus for providing the search screen includes a data communication unit 200, an operation unit 201, an audio signal processing unit 202, an audio output unit 203, a video signal processing unit 204, a display unit 205, a control unit 206 and a search screen generation unit 207.

The data communication unit 200 is connected to a storage medium in which data is stored to perform interface with the connected storage medium.

Here, the storage medium may be general memory card (MMC, SD, MC, SMC, and SF, etc.) and may also be a hard disk (HDD) that is a mass storage medium and a server in which shared data is stored.

Also, moving image data, still image data, audio data and text data may be included in the data stored in the storage medium.

In other words, still image data captured using a digital camera may be encoded as JPEG, TIFF, and BMP, etc. to be stored in the storage medium by way of example. In addition, data in a text type transmitted through a PC may also be stored in the storage medium and movie or music data provided through diverse devices including a server may also be stored therein.

Therefore, the data communication unit 200 includes a USB interface, a LAN interface and a HDD interface, etc.

The operation unit 201, which is a device that obtains a requirement instruction from a user, may include key buttons or an enter key for executing data search or setting data search conditions, etc.

Here, the operation unit 201 may be implemented as a touch screen module, a key input module, and a remote receiving module using a wireless communication such as a UV communication.

The touch screen module may be implemented on a display unit 205 to be described later, the key input module may be implemented by having function keys that set various functions of a TV on which a camera is mounted, and the remote receiving module serves to transfer diverse button signals input through a remote controller to a control unit 206.

At this time, when the operation unit 201 is implemented using the touch screen module, the function keys may be input using fingers or a touch pen, etc.

The audio signal processing unit 202 allows audio signals output through the data communication unit 200 to be signal-processed so that the audio signals can be output through the audio output unit 203.

At this time, the audio signal processing unit 202 may include an AC-3 decoder that decrypts and outputs audio signals of the output from the data communication unit 200, and a D/A converter that receives the output of the AC-3 decoder to convert it into analog signals.

The video signal processing unit 204 allows video signals output through the data communication unit 200 to be signal-processed so that the video signals can be displayed through a display unit 205.

At this time, the video signal processing unit 204 includes a MPEG-2 decoder and a scaler that converts the video data to conform to vertical frequency, resolution, and screen ratio, etc. that conform to the output standard of the display unit 205.

Here, the display unit 205 can be applied to diverse type of display modules, such as digital light processing (DLP), a liquid crystal display (LCD), a plasma display panel (PDP), an organic light emitting diodes (OLED), etc.

The control unit 206 analyzes data stored in a specific storage medium of the storage media connected through the data communication unit 200, selected through the operation unit 201, and comprehends the types of data for the respective data stored in the storage medium.

Also, the control unit 206 sorts data stored in the storage medium according to the comprehended type of data.

Here, as the types of data, there are moving image data, still image data, music data, and text data.

Therefore, the control unit 206 analyzes additional information of the respective data provided through the data communication unit 200 and determines the types of the corresponding data based on the analyzed additional information.

The additional information provided through the data communication unit 200 includes names, sizes, generation dates and types, etc. of the corresponding data, and the control unit 206 determines the types of the respective data using type information included in the additional information.

In addition, the control unit 206 determines the type of the respective data by analyzing extensions for the provided data.

In other words, according to the respective types of data, the extensions corresponding thereto are different so that the control unit 206 determines the types of the respective data using the extensions.

As the extensions for the still image data, there are MBP, JPG, GIF, PCX and PNG, etc., as the extensions for the music data, there are WAV, MP3, WMA, ASF, and OGG, etc., as the extensions for the moving image data, there are MPEG, AVI, WMV, ASX, MOV, MP4, K3G, SWF, SKM, SVI, and VOB, etc., and as the extensions for the text data, there are HWP, DOC, and TXT, etc.

The search screen generation unit 207 generates a data search screen on which the data stored in the storage medium according to the types of data determined through the control unit 206 are sorted, respectively.

The search screen generation unit 207 generates virtual folders corresponding to the number of types of data determined through the control unit 206 and disposes the types of data corresponding to the generated folders, respectively.

In other words, if the number of the types of data determined through the control unit 206 is three, the search screen generation unit 207 generates three virtual folders thereof corresponding to the number of the types of data. In this manner, if the number of the types of data is four, the search screen generation unit 207 generates four virtual folders.

For example, if there are moving image data, still image data, music data and text data in the type of data determined through the control unit 206, the search screen generation unit 207 generates a virtual folder (Movie folder) corresponding to the type of moving image data, a virtual folder (Picture folder) corresponding to the type of still image data, a virtual folder (Music folder) corresponding to the type of music data, and a virtual folder (Text folder) corresponding to the type of text data, respectively.

And, in the virtual folders according to the types of the respective generated data, data corresponding thereto are disposed by the search screen generation unit 207.

In other words, the data according to the type of moving image data is disposed in the generated Movie folder, the data according to the type of still image data is disposed in the generated Picture folder, the data according to the type of music data is disposed in the generated Music folder, and the data according to the type of text image data is disposed in the generated Text folder.

Therefore, all of data stored in the storage medium are sorted according to the types of data, respectively, to be disposed in the virtual folders optionally generated.

Hereinafter, the operations of the control unit 206 and the search screen generation unit 207 will be described in more detail with reference to the accompanying drawings.

Figure 3:
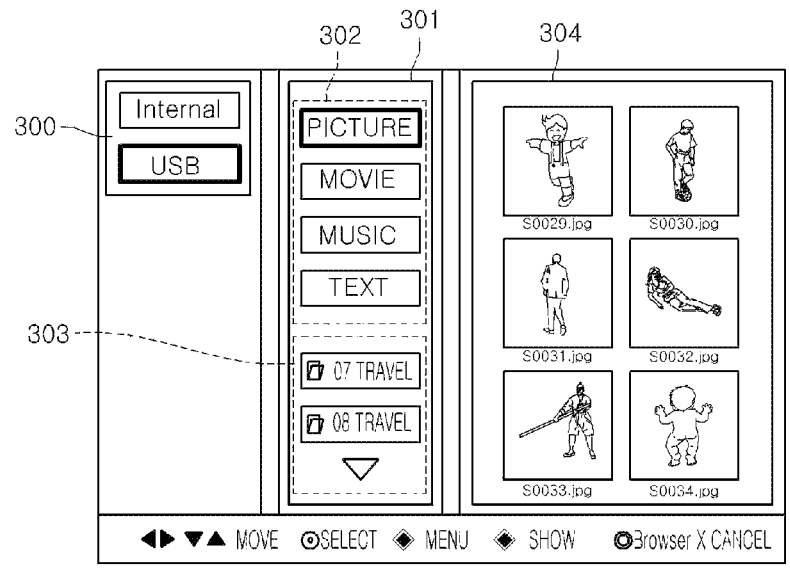
FIGS. 3, 4, 5 and 6 are views showing examples of a data search screen according to the present embodiment.

FIG. 3 is a view showing an example of a data search screen according to the present embodiment.

Referring to FIG. 3, the search screen generated through the search screen generation unit 207 includes a first region 300 on which icon information on a storage medium of icon information on entire storage media currently connected, selected by a user, is highlighted to be displayed, a second region 301 on which virtual folder icons generated corresponding to the types of data stored in the selected storage medium and icons for actual folder items are displayed, and a third region 304 on which preview information on data existing in a specific virtual folder of the virtual folder icons displayed on the second region 301, having a search cursor, and additional information of data existing in a specific actual folder of the actual folder items, having a search cursor, are displayed.

On the first region 300, the icon information on all the storage media currently connected are displayed, wherein icon information of the displayed icon information, selected by a user, or icon information on a specific storage medium on which the search cursor is positioned is highlighted to be displayed.

In other words, through FIG. 3, it can be appreciated that there are an internal storage medium Internal and an external storage medium USB in the storage media currently connected, wherein the external storage medium USB is the storage medium currently selected by the user.

The second region 301 includes a virtual folder region 302 on which virtual folder information optionally generated according to the types of data is displayed, and an actual folder region 303 on which information on folders actually exist in the corresponding storage media is displayed.

In the virtual folder region 302, there is the number of folders corresponding to the number of types of data existing in the selected storage medium.

In other words, through FIG. 3, it can be appreciated that in the storage medium currently connected, there are a total of four types of data, wherein there are moving image data, still image data, music data and text data.

Therefore, on the virtual folder region 302, a Movie folder icon, a Picture folder icon, a Music folder icon, and a Text folder icon, corresponding to the types of data, are displayed, respectively.

At this time, the icon items that are displayed on the virtual folder region 302 may be increased or decreased according to the types of data existing in the currently selected storage medium.

On the actual folder region 303, the icon information on folders actually existing within the storage medium is displayed.

In other words, if all the data existing in the storage medium are stored in a folder 'The Others' only the icon information on the folder 'The Others' is displayed on the actual folder region 303. Also, as shown in FIG. 3, the icon information on folders such as '07 Travel' and '08 Travel' may be displayed.

Also, the icon information on a specific folder of the icon items displayed on the second region 301, having a search cursor, is highlighted to be displayed.

On the third region 304, information corresponding to the specific icon of the icon information displayed on the second region 301, having a present search cursor, is displayed.

In other words, when the present search cursor is positioned on the specific virtual folder displayed on the second region 301, preview information on data existing in the corresponding virtual folder is displayed on the third region 304.

Also, when the present search cursor is positioned on the specific actual folder displayed on the second region 301, subfolder information existing in the actual folder and/or information on a file are displayed on the third region 304.

In other words, when a subfolder exists in the actual folder on which the search cursor is positioned, information on the number of subfolders existing in the actual folder is displayed and information on the number of data existing in the actual folder is also displayed.

For example, as shown in FIG. 3, when the present search cursor is positioned on the Picture folder item, only the preview video for the still image type of data is displayed on the third region 304.

Figure 4:
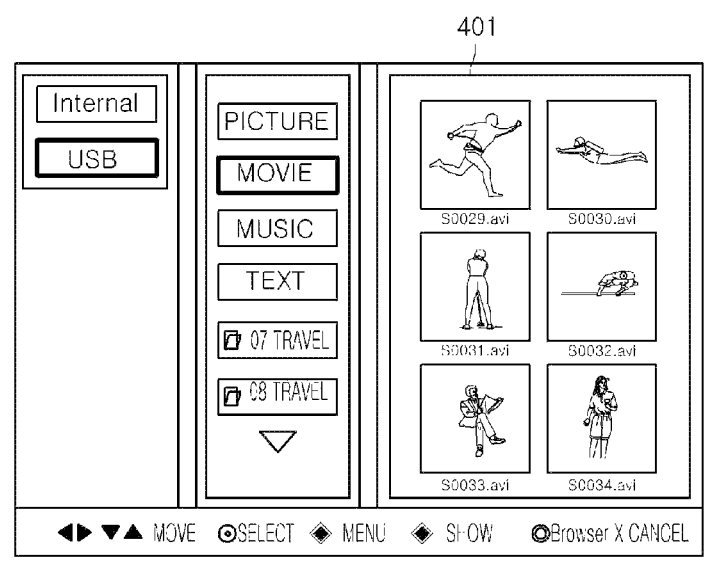

Also, as shown in FIG. 4, when the present search cursor is positioned on the Movie folder item, only the preview video for the moving image type of data is displayed on the third region 401.

Figure 5:
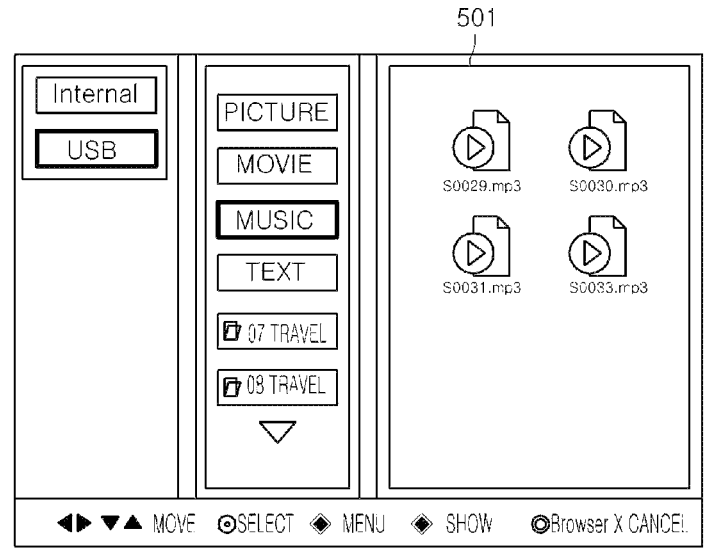

Also, as shown in FIG. 5, when the present search cursor is positioned on the Music folder item, only the preview video for the music type of data is displayed on the third region 501.

At this time, in the respective virtual folders, data according to the corresponding types of data do not actually exist but link information corresponding to actual positions of the corresponding data that executes the respective data exists.

Figure 6:
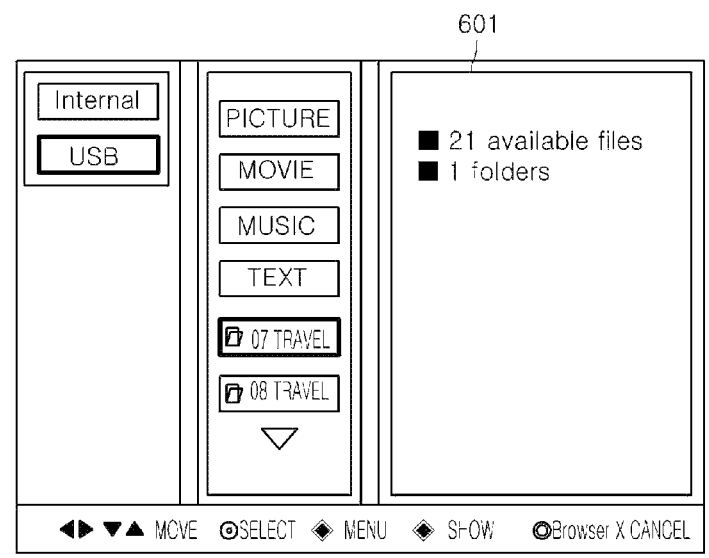

Also, as shown in FIG. 6, when the present search cursor is positioned on an actual folder item ('07 Travel'), information on the number of folders and on the number of subfolders existing in the actual folder ('07 Travel') are displayed on the third region 601.

As described above, on the data search screen provided according to the present embodiment, a search is performed by sorting data according to the types of data, making it possible to provide consistency and convenience of User Interface for data search.

Also, in an apparatus for providing a search screen according to another embodiment, a user can optionally set display conditions of the data search screen.

Figure 7:
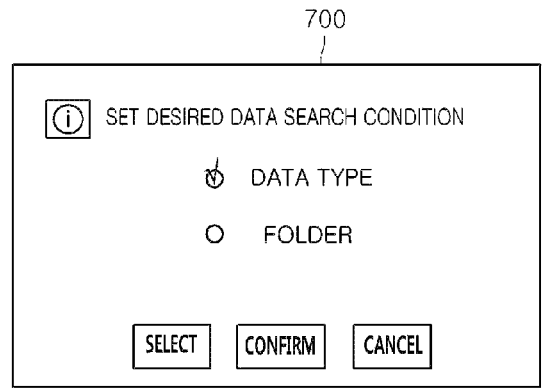
FIGS. 7, 8 and 9 are views showing examples of screens on which data search conditions are set according to the present embodiment.
Figure 8:
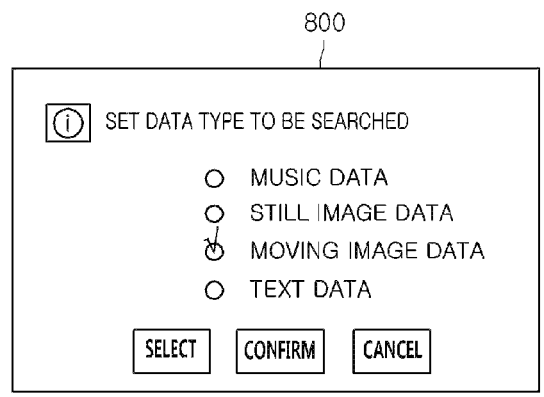
Figure 9:
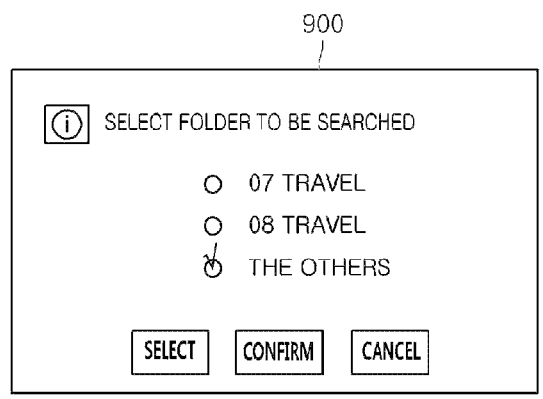

FIGS. 7, 8 and 9 are views showing examples of menu screens for setting data search conditions.

If an instruction on the setting of the data search condition is obtained through the operation unit 201, the control unit 206 displays a data search condition setting screen 700 as shown in FIG. 7.

On the data search condition setting screen, items through which conditions for the data search can be set are displayed.

Here, the data search condition includes a data type condition and a folder condition.

The data type condition is a condition for setting a specific data type to be searched, and the folder condition is a condition for setting a specific folder to be searched.

At this time, when a specific condition is set on the data search condition setting screen, a detailed search condition setting screen that can set detailed conditions for the set specific condition is displayed.

For example, when the condition of data type is set on the data search condition setting screen, the detailed search condition setting screen that selects a specific type of data of all the types of data is displayed.

In other words, as shown in FIG. 8, a setting screen 800 on which the type of audio data, the type of still image data, the type of moving image data, and the type of text data can be selected, respectively, is displayed, and wherein at least one type of data to be searched can be selected on the displayed setting screen.

At this time, the described type of data is optionally designated for explanation of the present embodiment, and it is obvious that any types of data other than the described type of data can be substantially added.

Therefore, the control unit 206 confirms data belonging to the selected specific type of data and allows only the confirmed data to be sorted from data belonging to other types thereof.

Also, the search screen generation unit 207 generates only the virtual folder according to the selected type of data and disposes data corresponding thereto in the generated virtual folder.

For example, when the type of moving image data is set on the detailed search condition setting screen, the control unit 206 confirms and sorts the moving image type of data of the data stored in the storage medium.

And, the search screen generation unit 207 generates only the virtual folder (Movie folder) corresponding to the moving image type and disposes the moving image type of data sorted through the control unit 206 in the generated virtual folder.

In conclusion, in the search screen according to one embodiment, the virtual folders are generated according to the number of data existing in the storage medium, however, in the search screen according to another embodiment, the virtual folders are generated according to the number of the data types to be set.

Also, when the folder conditions are set on the data search condition setting screen, the detailed search condition setting screen for selecting only a specific folder of all the folders existing in the storage medium is displayed.

In other words, as shown in FIG. 9, all folder information ('07 Travel', '08 Travel' and 'The Others') existing in the corresponding storage medium is displayed on the detailed search condition setting screen 900, and a user selects his or her desired specific folder from the displayed folder information.

Also, when the folder item 'The Others' is selected, the control unit 206 sorts only the data existing in the folder 'The Others' according to the types of data. And, the search screen generation unit 207 generates virtual folders corresponding to the number of the types of data sorted through the control unit 206 and disposes the types of data corresponding thereto in the generated virtual folders.

As described above, another embodiment provides convenience that a user can easily search only his or her desired specific type of data or the data existing in the specific folder.

Figure 10:
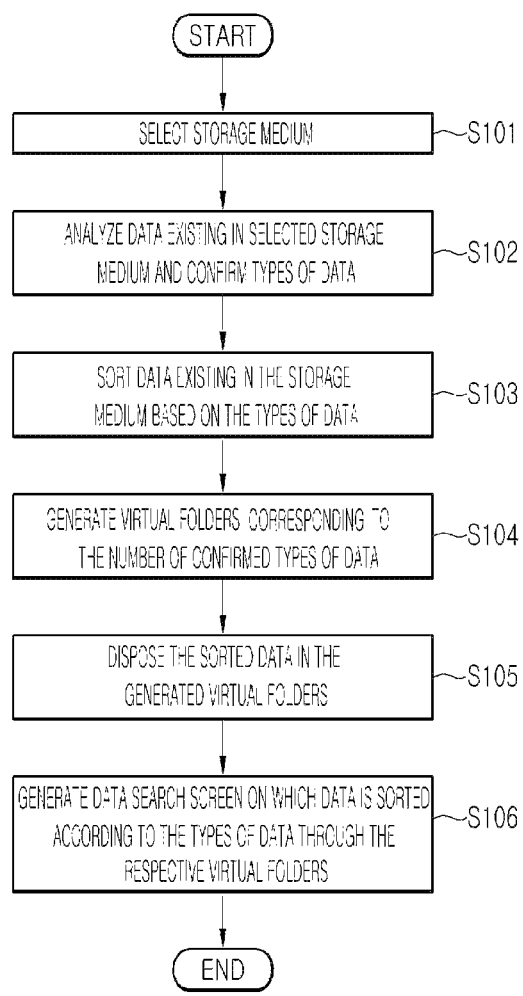
FIGS. 10, 11 and 12 are flowcharts showing a method for providing a search screen according to the present embodiment in steps.

FIG. 10 is a flowchart explaining a method for providing a search screen of an apparatus for a search screen according to the present embodiment in steps.

Referring to FIG. 10, in the method for providing the search screen according to the present embodiment, a storage medium to be searched is first selected (S101). In other words, a specific storage medium of storage media currently connected, desired to be searched, is selected.

Continuously, the data existing in the selected storage medium is analyzed to confirm the types of the respective data (S102). In other words, the types of data are confirmed using additional information of the respective data existing in the storage medium or the types of data are confirmed using extension information of the respective data.

And, all the data stored in the storage medium is sorted based on the confirmed type of data (S103). In other words, the data confirmed as the moving image type are grouped into one group, and the data confirmed as the still image type are grouped into one group. In this manner, data other than the above are grouped into each type of the same data.

Continuously, virtual folders corresponding to the number of the confirmed types of data are generated (S104). In other words, if the number of the confirmed types of data is four, four virtual folders are generated, and if the number of the types of the confirmed data is three, three virtual folders are generated.

And, the data grouped into each type of the same data are disposed in the virtual folders generated corresponding to the number of the types of data, respectively (S105). In other words, the moving image type of data that are grouped into one group are disposed in the virtual folder corresponding thereto, and the still image type of data that are grouped into one group are disposed in the virtual folder corresponding thereto.

Continuously, a data search screen that is sorted according to the types of data through the virtual folders is generated (S106).

Figure 11:
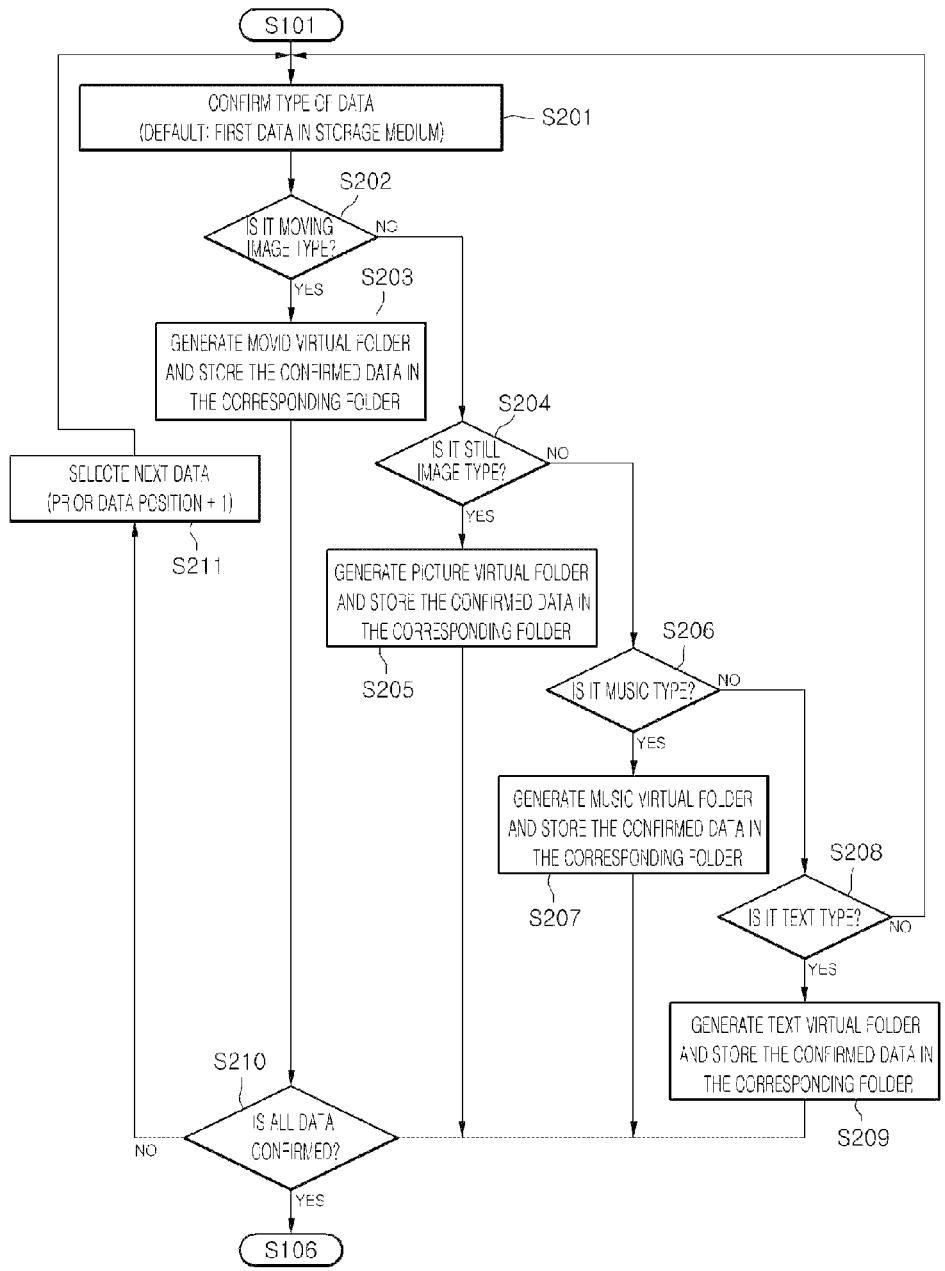

FIG. 11 is a flowchart explaining FIG. 10 in more detail.

Referring to FIG. 11, first the type of data for a first data of data existing in the storage medium selected in the step S101 is confirmed (S201). For example, the first data may be a first ranked data of data existing in a first ranked folder determined according to folder names, determined according to data names.

Continuously, the confirmed type of data is confirmed whether it is a moving image type (S202).

And, as a result of the confirmation (S202), if the confirmed type of data is the moving image type, a Movie virtual folder is generated and the data confirmed as the moving image type is stored in the generated Movie virtual folder (S203). Here, the generation process of the virtual folder is performed only when a virtual folder corresponding to the type of data does not exist. Also, when the virtual folder corresponding to the type of data exists, the data confirmed as the moving image type is stored in the generated virtual folder.

Continuously, as a result of the confirmation (S202), if the confirmed type of data is not the moving image type, it is confirmed whether the type of data is a still image type (S204).

And, as a result of the confirmation (S204), if the confirmed type of data is the still image type, a Picture virtual folder is generated and the data confirmed as the still image type is stored in the generated Picture virtual folder (S205). Here, the generation process of the virtual folder is performed only when a virtual folder corresponding to the type of data does not exist. Also, when the virtual folder corresponding to the type of data exists, the data confirmed as the still image type is stored in the generated virtual folder.

Continuously, as a result of the confirmation (S204), if the confirmed type of data is not the still image type, it is confirmed whether the type of data is a music type (S206).

And, as a result of the confirmation (S206), if the confirmed type of data is the music type, a Music virtual folder is generated and the data confirmed as the music type is stored in the generated Music virtual folder (S207). Here, the generation process of the virtual folder is performed only when a virtual folder corresponding to the type of data does not exist. Also, when the virtual folder corresponding to the type of data exists, the data confirmed as the music type is stored in the generated virtual folder.

Continuously, as a result of the confirmation (S262), if the confirmed type of data is not the music type, it is confirmed whether the type of data is a text type (S208).

And, as a result of the confirmation (S208), if the confirmed type of data is the text type, a Text virtual folder is generated and the data confirmed as the text type is stored in the generated Text virtual folder (S209). Here, the generation process of the virtual folder is performed only when a virtual folder corresponding to the type of data does not exist. Also, when the virtual folder corresponding to the type of data exists, the data confirmed as the text type is stored in the generated virtual folder.

Continuously, it is determined whether the types of all data existing in the selected storage medium are confirmed (S210).

And, as result of the determination (S210), if the types of all data are confirmed, the method for providing the search screen is ended, and if the types of all data are not confirmed, it is returned to the step (S201) by selecting data after confirming thereof.

Figure 12:
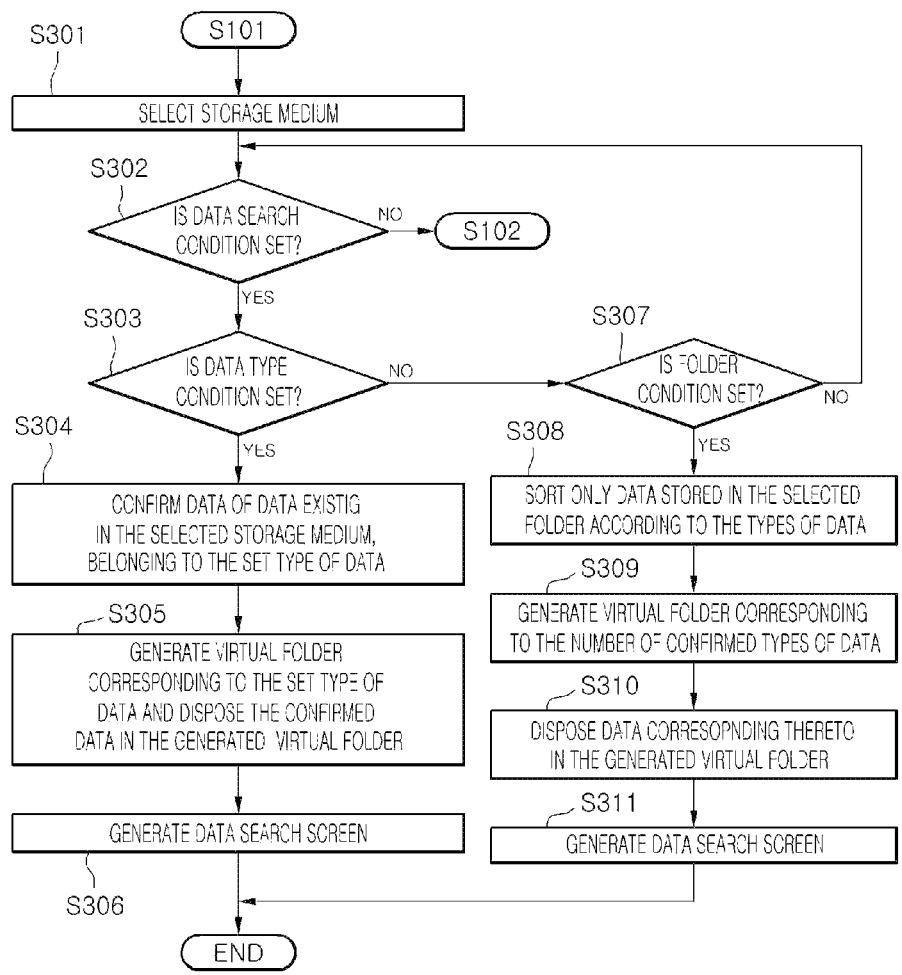

FIG. 12 is a flowchart explaining a method for providing a search screen according to another embodiment in steps.

Referring to FIG. 12, in the method for providing the search screen according to another embodiment, a specific storage medium to be searched is first selected (S301).

Continuously, it is determined whether a data search condition is set (S302).

And, as a result of the determination (S302), if the data search condition is not set, it enters the step (S102), and if the data search condition is set, it is determined whether the set data search condition is a data type condition (S303).

Continuously, as a result of the determination (S303), if the set data search condition is the data type condition, only the data of the data existing in the storage medium, belonging to the set data type, is separately sorted (S304). For example, if the set data type condition is a moving image type, only the moving image type of data of the data existing in the storage medium are grouped into one group and are sorted to be distinguished from data other than the data.

And, only a virtual folder corresponding to the set data type condition is generated and the separately sorted data are disposed in the generated virtual folder (S035). For example, if the set data type condition is a moving image type, only a Movie virtual folder is generated and then the separately sorted data in the generated Movie virtual folder.

Continuously, a data search screen on which only the data belonging to the specific data type are sorted through the virtual folder is generated (S306).

Also, as a result of the determination (S303), if the set data search condition is not the data type condition, it is determined whether the set data search condition is a folder condition (S307).

Continuously, as a result of the determination (S307), if the set data search condition is the folder condition, only the data of the data existing in the storage medium, existing in the set specific folder, are sorted based on the data type (S308). In other words, the data confirmed as the moving image type are grouped as one group, and the data confirmed as the still image type are grouped as one group. Also, the sorting process is performed only on the set specific folders.

Continuously, virtual folders corresponding to the number of the types of the grouped data are generated (S309). In other words, if the number of the confirmed types of data is four, four virtual folders are generated, and if the number of the confirmed types of data is three, three virtual folders are generated.

And, the data grouped into each type of the same data are disposed in the virtual folders generated corresponding to the number of the types of the data, respectively (S310). In other words, the moving image type of data that are grouped into one group are disposed in the virtual folder corresponding thereto, and the still image type of data that are grouped into one group are disposed in the virtual folder corresponding thereto.

Continuously, a data search screen on which data are sorted according to the types of data only for the specific folders, respectively, is generated (S311).

The foregoing description is only to exemplarily illustrate the technical idea of the present invention and various amendments and modifications will be possible by those skilled in the art, not being out of the scope, technical idea and other objects of the present invention. Accordingly, the embodiments of the present invention are merely provided to more clearly understand the present invention, not to limit the technical idea of the present invention, and the scope of the technical idea of the present invention is not limited by these embodiments. The protection scope of the present invention should be defined by the following claims, and all the technical ideas within the scope equivalent to the appended claims will be construed as being included in the claims of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for providing a search screen, the apparatus comprising:
   a storage medium;
   an operation to obtain an instruction for executing a file search or setting a file search condition;
   a data communication unit to perform a data communication with the storage medium in which one or more files are stored;
   a control unit to sort the one or more files based on a type of the file;
   a search screen generation unit to generate a search screen for the one or more files sorted based on the type of file; and
   a display unit to display the search screen and a search condition setting screen,
   wherein the search screen includes:
   a first region displaying a first icon representing an internal storage media of the apparatus and displaying a second icon representing an external storage media connected to the apparatus,
   a second region including virtual folder icons and actual folder icons, wherein each virtual folder icon corresponds to each type of file stored in the internal storage media or external storage media corresponding to a selected first or second icon in the first display region, and wherein each actual folder icon corresponds to each folder stored in the internal storage media or external storage media corresponding to the selected first or second icon in the first display region, and
   a third region displaying thumbnail information on a selected virtual folder in the second display region,
   wherein the search screen generation unit groups the one or more files included on the selected internal or external storage media into the virtual folder icons such that each corresponding virtual folder icon points only to the same type of file, wherein when one icon is selected among the first icon and the second icon, the control unit generates the virtual folder icons corresponding to the number of types of the one or more files stored in the storage media corresponding to the selected one icon, wherein the number of virtual folders is changed according to the number of the types of the one or more files stored in the storage media corresponding to the selected one icon, wherein the search condition setting screen includes:

a file type condition to set a specific file type to be searched, and a folder type condition to set a specific folder to be searched, wherein a detailed search condition setting screen to select a specific type of file among all the types of files is provided when the file type condition is set on the search condition setting screen, wherein, when the specific type of file is selected, the control unit creates a single virtual folder including only the specific type of files, wherein all actual folders stored in the selected internal or external storage media is provided when the folder type condition is set on the search condition setting screen, and wherein, when one folder among all actual folders is selected, the control unit creates the virtual folder icons corresponding to data included on the internal storage media or external storage media.

2. The apparatus according to claim 1, wherein the virtual folder icons include a music virtual folder icon pointing only to music files, a still image folder icon pointing only to still image files, a moving folder icon pointing only to moving image files, and a text folder icons pointing to only text files.

3. The apparatus according to claim 1, wherein if an instruction on a specific folder to be sorted through a user's operation is obtained through the operation unit, the control unit performs only a sorting on the specific folders obtained by the operation unit based on the type of file.

4. The apparatus according to claim 1, wherein an actual folder icon for the storage medium highlighted on the first region is further included in the second region.

5. The apparatus according to claim 4, wherein information on the number of files and the number of subfolders for the actual folder selected in the second region is further included in the third region.

6. The apparatus according to claim 1, wherein if a specific type of file is selected through the operation unit, the control unit confirms files belonging to the selected specific type of file and allows only the confirmed file to be sorted from files belonging to other types thereof, and wherein the search screen generation unit generates only a virtual folder corresponding to the selected specific type of file and disposes the confirmed file corresponding thereto in the virtual folder for the generated specific type of file.

7. A method of searching and displaying files, the method comprising:

obtaining, via an operation unit, an instruction for executing a file search or setting a file search condition;

performing, via a data communication unit, a data communication with a storage medium in which one or more files are stored;

sorting, via a control unit, the one or more files based on a type of file;

generating, via a search screen generation unit, a search screen for the one or more files sorted based on the type of file; and displaying, via a display unit, the search screen and a search condition setting screen, wherein the search screen includes:

a first region displaying a first icon representing an internal storage media of the apparatus and displaying a second icon representing an external storage media connected to the apparatus, a second region including virtual folder icons and actual folder icons, wherein each virtual folder icon corresponds to each type of file stored in the internal storage media or external storage media corresponding to a selected first or second icon in the first display region, and wherein each actual folder icon corresponds to each folder stored in the internal storage media or external storage media corresponding to the selected first or second icon in the first display region, and a third region displaying thumbnail information on a selected virtual folder in the second display region, wherein the generating step groups the data included on the selected internal or external storage media into the virtual folder icons such that each corresponding virtual folder icon points only to the same type of file, wherein when one icon is selected among the first icon and the second icon, the control unit generates the virtual folder icons corresponding to the number of types of the one or more files stored in the storage media corresponding to the selected one icon, wherein the number of virtual folders is changed according to the number of the types of the one or more files stored in the storage media corresponding to the selected one icon, wherein the search condition setting screen includes:

a file type condition to set a specific file type to be searched, and a folder type condition to set a specific folder to be searched, wherein a detailed search condition setting screen to select a specific type of file among all the types of files is provided when the file type condition is set on the search condition setting screen, wherein, when the specific type of file is selected, the method further comprises creating a single virtual folder including only the specific type of files, wherein all actual folders stored in the selected internal or external storage media is provided when the folder type condition is set on the search condition setting screen, and wherein, when one folder among all actual folders is selected, the method further comprises creating the virtual folder icons corresponding to data included on the internal storage media or external storage media.

8. The method according to claim 7, wherein the virtual folder icons include a music virtual folder icon pointing only to music files, a still image folder icon pointing only to still image files, a moving folder icon pointing only to moving image files, and a text folder icons pointing to only text files.

9. The method according to claim 7, wherein if an instruction on a specific folder to be sorted through a user's operation is obtained through the operation unit, the performing step performs only a sorting on the specific folders obtained by the operation unit based on the type of file.

10. The method according to claim 7, wherein an actual folder icon for the storage medium highlighted on the first region is further included in the second region.

11. The method according to claim 10, wherein information on the number of files and the number of subfolders for the actual folder selected in the second region is further included in the third region.

12. The method according to claim 7, wherein if a specific type of file is selected through the operation unit, the method further comprises confirming files belonging to the selected specific type of file and allows only the confirmed file to be sorted from files belonging to other types thereof, generating only a virtual folder corresponding to the selected specific type of file, and disposing the confirmed file corresponding thereto in the virtual folder for the generated specific type of file.

* * * * *